Jan. 1, 1935.  A. ENGLAND  1,986,467
HOSE COUPLING GAUGE
Filed June 27, 1933
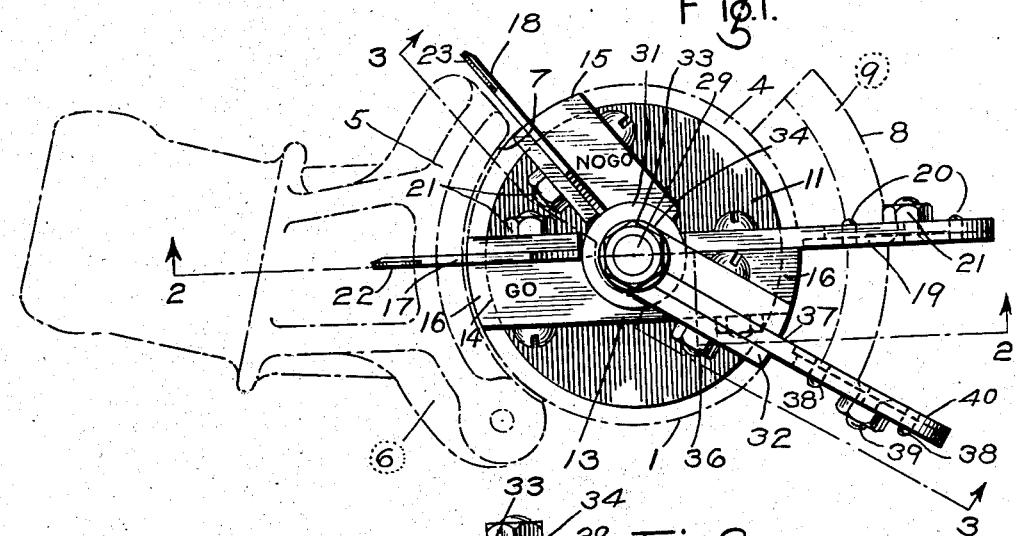
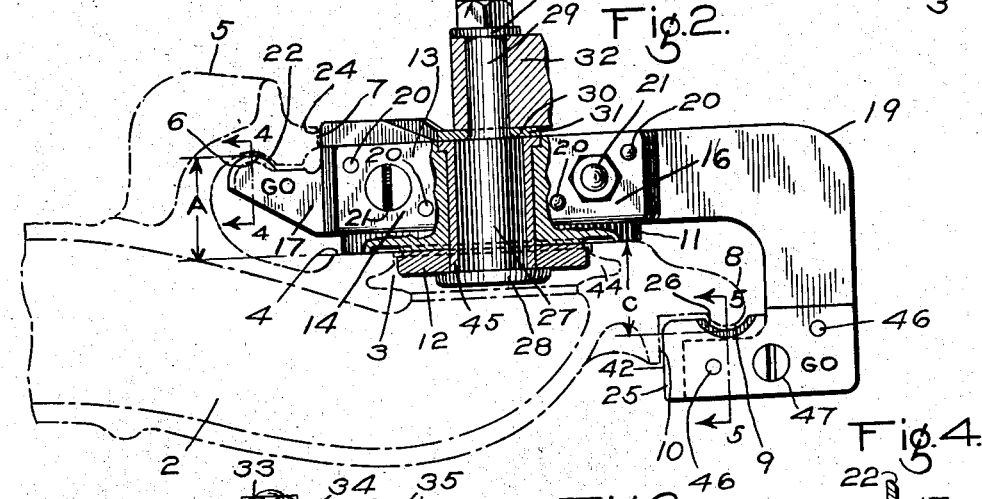
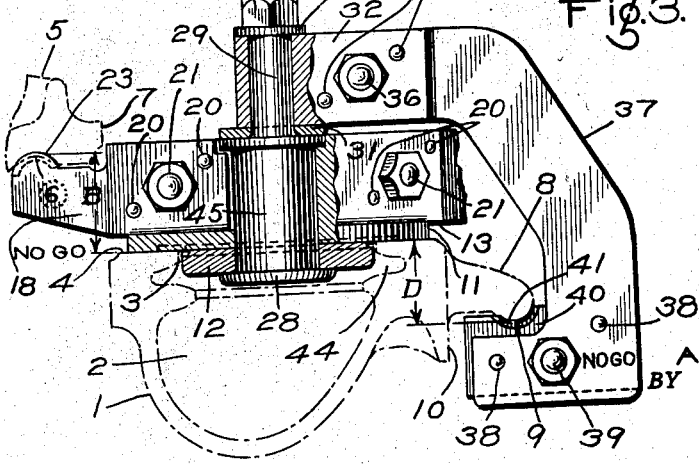
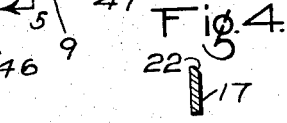
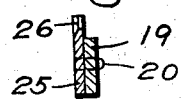
INVENTOR
ALEXANDER ENGLAND
BY *Wm. M. Cady*
ATTORNEY Patented Jan. 1, 1935

1,986,467

UNITED STATES PATENT OFFICE 1,986,467

HOSE COUPLING GAUGE

Alexander England, Wilkinsburg, Pa., assignor to The Westinghouse Air Brake Company, Wilmerding, Pa., a corporation of Pennsylvania Application June 27, 1933, Serial No. 677,807

4 Claims. (Cl. 33—174)

This invention relates to test gauges and more particularly to a test gauge for hand operated hose couplings.

The usual hose coupling has a coupling face through which is provided a lateral bore adapted to carry a ring gasket for effecting a leakproof seal with a corresponding gasket in a counterpart coupling when two couplings are coupled together. At one side of the lateral bore the coupling is provided with an angular guard arm having formed in the inner face a circular groove concentric with the bore in the coupling, while at the opposite side of the bore the coupling is provided with a locking flange upon which is formed a convex rib also concentric with said bore and adapted to engage in the groove in the guard arm of a counterpart coupling for securing two couplings together. The side of the guard arm facing the bore in the coupling is machined concentric with said bore and a flange on the body of the coupling, adjacent the locking flange, is provided with a machined surface concentric with the bore and is adapted to engage the machined surface on the guard arm of a counterpart coupling for aligning two couplings and consequently the gaskets therein in the act of coupling two couplings and also for maintaining said couplings and gaskets in alignment when the couplings are coupled.

If the vertical distance between the groove in the guard arm or the rib on the locking flange and the coupling face exceeds a predetermined degree, then when two couplings are coupled, the gaskets in the coupling may not engage to effect a seal, while if this distance is less than a predetermined degree the gaskets in the two couplings may tend to lock against each other and therefore become distorted in the act of coupling which will result in leakage. If the machined surface on the side of the guard arm facing the bore is too far from the center of the bore or if the machined surface on the flange on the body adjacent the locking flange is too close to the center of said bore, then in coupling two couplings the resultant excessive clearance between said surfaces tends to prevent proper alignment of the coacting groove and rib and also of the counterpart gaskets which may result in the improper coupling of two couplings and excessive leakage.

The principal object of my invention is to provide a test gauge for hose couplings to determine whether the distance from the groove in the guard arm and the rib on the locking flange to the coupling face of the coupling is within predetermined limits, and also whether the distance from the machined surface on the side of the guard arm facing the bore in the coupling face and the machined surface on the flange on the coupling body adjacent the locking flange to the center of the bore in the coupling is satisfactory.

In the accompanying drawing: Fig. 1 is a plan view of a test gauge embodying my invention and shown applied to a hose coupling; Fig. 2 is a sectional view taken on the line 2—2 of Fig. 1; Fig. 3 is a sectional view taken on the line 3—3 of Fig. 1; Fig. 4 is a sectional view taken on the line 4—4 of Fig. 2; and Fig. 5 is a sectional view taken on the line 5—5 of Fig. 2.

In the drawing the hose coupling is shown in dot and dash lines to more clearly show the test gauge applied thereto, said coupling being of the usual type comprising a body 1 having a laterally disposed coupling face 4 and a fluid conduit 2 leading to a bore 3 which opens to the lateral face 4. Adjacent the lateral face 4, the usual gasket groove 44 opens into the bore 3 and is adapted to carry the usual coupling gasket (not shown).

The coupling 1 is provided with the usual guard arm 5 having an internally disposed segmental circular groove 6, the side of the guard arm adjacent the bore 3 being machined to provide a bearing surface 7, said groove and bearing surface being concentric with the bore 3. On the side of bore 3 opposite the guard arm 5, the coupling 1 is provided with the usual locking flange 8 having a segmental circular rib 9 concentric with the bore 3, the coupling body 1 having a flanged portion provided with a segmental circular face 10 machined also concentric with bore 3.

The gauge for testing the coupling comprises a circular plate 11 adapted to engage face 4 of the coupling, a boss 12 on one side of said plate adapted to fit into bore 3 of the coupling and a member 13 on the opposite side of said plate. The member 13 consists of fixed spaced arms 14, 15 and 16 and secured to said arms by means of bolts 21 are gauge blades 17 and 18 and a U-shaped arm 19, respectively, said blades and arm being arranged radially with respect to the circular plate 11. The correct positioning of the blades 17 and 18 and the arm 19 is determined by dowel pins 20 provided in the arms 14, 15 and 16, respectively.

Adjacent the ends of blades 17 and 18 and on the side opposite the circular plate 11, said blades are provided with convex gauging portions 22 and 23, respectively, of substantially the same contour as that of groove 6 in the coupling. The vertical distance A between the outer face of plate 11 and gauging portion 22 of blade 17 represents the minimum vertical distance between face 4 of the coupling and groove 6 in the guard arm 5 which it is possible to permit for satisfactory functioning of the coupling. The gauging portion 23 on the blade 18 is a greater distance from the outer face of plate 11 than is the gauging portion 22 of blade 17, and this greater distance, designated B, is slightly greater than the maximum permissible for satisfactory operation of a coupling. The gauging portions 22 and 23 of blades 17 and 18 are beveled to obtain a narrow gauging edge as is shown in Figs. 2, 3 and 4.

The blade 17 is provided with an extension, the outer edge 24 of which is arranged parallel to the axis of plate 11 and is spaced therefrom a predetermined distance.

A gauge blade 25 is positioned in the outer end of the U-shaped arm 19 by dowel pins 46 and is secured thereto by a bolt 47 and is provided with a concave gauging portion 26 the contour of which corresponds substantially to the contour of the rib 9 of the locking flange 8. The inner vertical edge 42 of the blade 25 is spaced a predetermined distance from the central axis of plate 11.

A bore is provided through the boss 12, plate 11 and member 13 and contained in said bore is a bushing 45. A bolt 27 is rotatably mounted in a bore in the bushing 45, said bolt having a head 28 engaging the boss 12 and one end of the bushing 45, and having a portion 29 of reduced diameter extending beyond the opposite end of said bushing. A shoulder 30 is formed at the junction of the portion of the bolt 27 within the bushing and the portion 29, and a washer 31 is mounted against said shoulder. A member 32 having a bore in which the portion 29 of the bolt 27 is mounted is secured against the washer 31 by means of a nut 33 screw-threaded to the outer end of the bolt 27, a washer 34 being interposed between the nut 33 and member 32. By this construction, the member 32 is firmly clamped between washers 31 and 34 and since the washer 31 engages shoulder 30 on the bolt, which shoulder is flush with the end of bushing 26, the bolt 27 is prevented from moving endwise but is freely rotatable in said bushing.

The member 32 carried by the bolt 27 is slotted, and mounted in the slot is an arm 37 which is secured in place by a bolt 36, the positioning of said arm being determined by dowel pins 35. Secured in the end of arm 37 by means of a bolt 39 and positioned by dowel pins 38 is a gauge blade 40 having a concave gauging portion 41, the contour of which is substantially the same as that of the circular rib 9 on the hose coupling locking flange 8.

The concave gauging portions 26 and 41 of the gauge blades 25 and 40 are preferably beveled as shown in Figs. 2, 3 and 4 to provide a narrow gauging edge. The vertical distance C from the outer face of the gauge ring 11 to the gauging surface 26 of the blade 25 represents the maximum permissible distance from the coupling face 4 of the hose coupling to the rib 9 on the locking flange 8, while the vertical distance D from the outer face of gauge ring 11 to the gauging surface 41 on blade 40 is slightly less than the minimum distance required between the coupling face 4 of the hose coupling and the rib 9 to ensure satisfactory functioning of the coupling.

To use the gauge, the arm 37 carried by the member 32 is turned away from the arm 19 a somewhat greater distance than shown in Fig. 1. The gauge is then applied to the hose coupling 1, the boss 12 entering the bore 3 and the circular plate 11 engaging the coupling face 4 of the coupling. The gauge is then turned on the coupling in a counter-clockwise direction, as viewed in Fig. 1. If the groove 6 in guard arm 5 is not too close to the face 4 of the coupling, the gauging portion 22 of blade 17 freely enters said groove, while at substantially the same time, the gauging portion 26 of blade 25 moves over the rib 9 on the locking flange 8 if said rib is not too far from the coupling face 4. The gauge is then turned further in the above mentioned direction and if the groove 6 in guard arm 5 is not too far away from the coupling face 4 of the coupling the gauging portion 23 of the blade 18 engages the guard arm 5 and therefore does not enter the groove 6. The movable arm 37 is now turned towards the locking flange 8 and if the rib 9 on said flange is not too close to the face 4 of the coupling the gauging portion 41 of said blade engages said rib. It will now be evident that the gauging portions 22 and 23 of blades 17 and 18 respectively gauge the vertical distance from the coupling face 4 to groove 6 in the guard arm and this distance must be within the limits defined by the gauging portions of said blades to be satisfactory for use. Also, the gauging portions 26 and 41 of the blades 25 and 40 respectively gauge the vertical distance from the coupling face 4 to the rib 9 on the locking flange 8, and this distance must be within the limits defined by the gauging portions of said blades to be satisfactory for use.

The vertical edge 24 of the blade 17 and the vertical edge 42 of blade 25 being both located a predetermined distance from the longitudinal axis of the bolt 27 provide a means by which a checker may visually determine whether the machined surface 7 on the guard arm and 10 on the body flange adjacent the locking flange of the coupling are located within a predetermined distance from the opening of the coupling.

It will now be evident that by means of the hose coupling gauge the condition of groove 6 in the guard arm 5 and of rib 9 on the locking flange 8 can be accurately and quickly determined within predetermined limits, and also the condition of the machined surface on the outer face of the guard arm and that on the body flange adjacent the locking flange can be determined.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A gauge for checking the spacing of the groove in the guard arm and the rib on the locking flange of a hose coupling with respect to the coupling face of the hose coupling which hose coupling has a fluid conducting bore opening at the coupling face, said gauge comprising a member adapted to seat on said coupling face, means for positioning said member in a predetermined relation to said fluid conducting bore, and gauge means carried by said member and movable relatively to said groove and rib for indicating whether or not the distance from said coupling face to said groove and rib is within predetermined limits.

2. A gauge for checking the spacing of the groove in the guard arm and the rib on the locking flange of a hose coupling with respect to the coupling face of the hose coupling which hose coupling has a fluid conducting bore opening at the coupling face, said gauge comprising a member adapted to seat on said coupling face, a boss on said member adapted to be positioned in said fluid conducting bore, gauge means carried by said member and movable relatively to said groove for determining whether or not the distance from said coupling face to said groove is within predetermined limits, and other gauge means carried by said member and movable relatively to said rib for determining whether or not the distance from said coupling face to said rib is within predetermined limits.

3. A gauge for checking the spacing of the groove in the guard arm and the rib on the locking flange of a hose coupling with respect to the coupling face of the hose coupling which hose coupling has a fluid conducting bore opening at the coupling face, said gauge comprising a movable member adapted to seat on said coupling face, a boss on said member adapted to fit into said fluid conducting bore, a pair of spaced gauge means fixed to said member and projecting therefrom and movable relative to said guard arm, one of said gauge means being adapted to determine whether the groove in the guard arm is too close to the coupling face and the other of said gauge means being adapted to determine whether the groove in the guard arm is too far from said coupling face, another gauge means fixed to said member and projecting therefrom and movable relative to said locking flange for determining whether said rib is too far from said coupling face, and other guage means rotatably carried by said member and movable relative to said rib for determining whether said rib is too close to said coupling face.

4. A gage for checking the distance from the plane of the coupling face of a hose coupling to the groove in the guard arm and to the rib on the locking flange and the distance from the axis of the fluid conducting bore opening at the coupling face to the machined surface on the guard arm adjacent the bore and to the machined surface on the flange of the coupling adjacent the locking flange, said gauge comprising a movable member adapted to seat on said coupling face, a boss on said member adapted to be positioned in said bore, three spaced fixed radiating arms projecting from said member, a gauge carried by one of said arms for checking the minimum distance from the plane of the coupling face to the groove in said arm and for checking the distance from the axis of said bore to the machined surface on the guard arm, a gauge carried by another of said arms for checking the maximum distance from the plane of the coupling face to the groove in said arm, a gauge carried by the other of said arms for checking the maximum distance from the plane of the coupling face to said rib and for checking the distance from the axis of said bore to the machined surface on the flange of the coupling adjacent the locking flange, a movable arm associated with said member, and a gauge carried by said movable arm for checking the minimum distance from the plane of the coupling face to said rib.

ALEXANDER ENGLAND.